United States Patent
Odate et al.

(10) Patent No.: US 11,027,748 B2
(45) Date of Patent: Jun. 8, 2021

(54) AUTOMATIC DRIVING CONTROL DEVICE

(71) Applicant: HONDA MOTOR CO., LTD., Tokyo (JP)

(72) Inventors: Shotaro Odate, Wako (JP); Yoshinobu Mukai, Wako (JP); Naotaka Kumakiri, Wako (JP); Naohiro Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 200 days.

(21) Appl. No.: 16/088,973

(22) PCT Filed: Mar. 29, 2016

(86) PCT No.: PCT/JP2016/060015
§ 371 (c)(1),
(2) Date: Sep. 27, 2018

(87) PCT Pub. No.: WO2017/168541
PCT Pub. Date: Oct. 5, 2017

(65) Prior Publication Data
US 2019/0092346 A1 Mar. 28, 2019

(51) Int. Cl.
*B60W 50/14* (2020.01)
*B60W 40/08* (2012.01)
(Continued)

(52) U.S. Cl.
CPC ............ *B60W 50/14* (2013.01); *B60W 10/04* (2013.01); *B60W 10/20* (2013.01); *B60W 30/00* (2013.01);
(Continued)

(58) Field of Classification Search
CPC ...... B60W 50/14; B60W 50/08; B60W 30/00; B60W 10/04; B60W 10/20; B60W 40/08;
(Continued)

(56) References Cited

U.S. PATENT DOCUMENTS

2016/0041553 A1* 2/2016 Sato ................... B60W 30/143
701/23
2018/0354517 A1* 12/2018 Banno ................. B60W 50/10

FOREIGN PATENT DOCUMENTS

| JP | 11-048819 | 2/1999 |
| JP | 2007-168720 | 7/2007 |

(Continued)

OTHER PUBLICATIONS

International Search Report and Written Opinion for International Application No. PCT/JP2016/060015 dated Jun. 28, 2016, 9 pages.
(Continued)

*Primary Examiner* — Michael V Kerrigan
(74) *Attorney, Agent, or Firm* — Amin, Turocy & Watson, LLP

(57) ABSTRACT

An automatic driving control device changes the degree of automation during an automatic control or the degree of change to the vehicle behavior during the automatic control, on the basis of the peripheral monitoring state of a driver, and on the basis of how easy it is to perform a switching operation for prioritizing manual control over automatic control. Thus, the automatic driving control device makes it possible to ensure the convenience of automatic control, by dynamically changing the degree of automation or the degree of change to the vehicle behavior, without uniformly stopping automatic control of steering and acceleration.

4 Claims, 9 Drawing Sheets

(51) Int. Cl.
| | |
|---|---|
| *B62D 6/00* | (2006.01) |
| *B60W 50/08* | (2020.01) |
| *B62D 15/02* | (2006.01) |
| *B62D 1/28* | (2006.01) |
| *B60W 30/00* | (2006.01) |
| *B60W 10/04* | (2006.01) |
| *B60W 10/20* | (2006.01) |
| *G08G 1/16* | (2006.01) |

(52) U.S. Cl.
CPC ............ *B60W 40/08* (2013.01); *B60W 50/08* (2013.01); *B62D 1/286* (2013.01); *B62D 6/007* (2013.01); *B62D 15/025* (2013.01); *B60W 2050/143* (2013.01); *B60W 2540/00* (2013.01); *B60W 2710/20* (2013.01); *B60W 2720/106* (2013.01); *G08G 1/167* (2013.01)

(58) Field of Classification Search
CPC ....... B60W 2050/143; B60W 2540/00; B60W 2710/20; B60W 2720/106; B60W 2040/0872; B60W 2040/0818; B60W 2540/22; B60W 2540/26; B60W 50/082; B62D 6/007; B62D 15/025; B62D 1/286; G08G 1/167
See application file for complete search history.

(56) References Cited

FOREIGN PATENT DOCUMENTS

| | | |
|---|---|---|
| JP | 2007-183831 | 7/2007 |
| JP | 2007-253820 | 10/2007 |

OTHER PUBLICATIONS

Japanese Office Action for Japanese Patent Application No. 2018-507863 dated Oct. 1, 2019.

\* cited by examiner

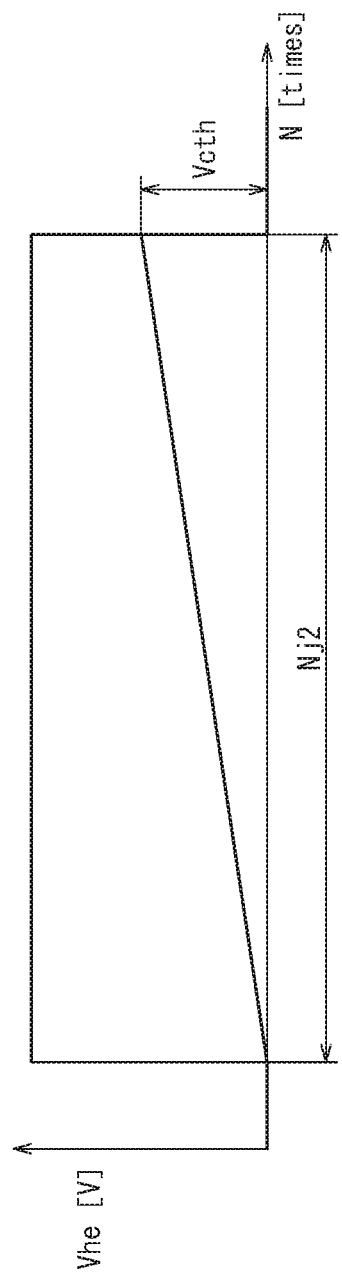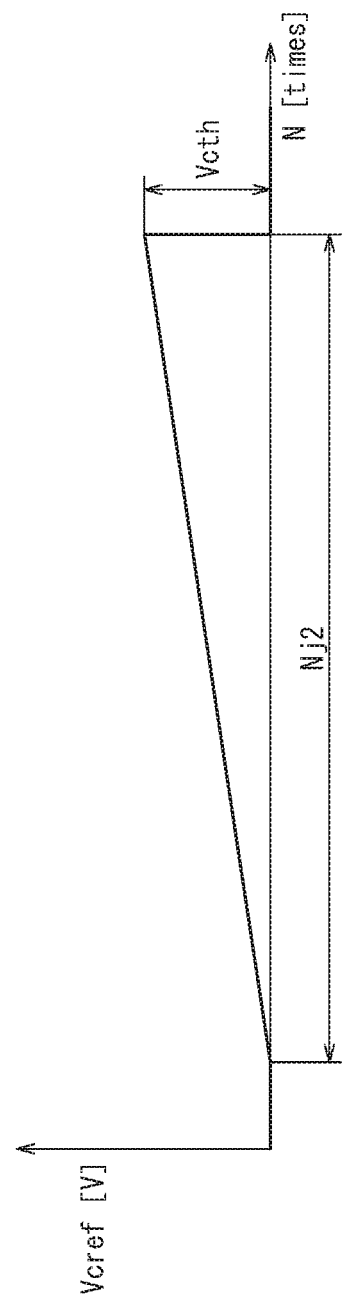

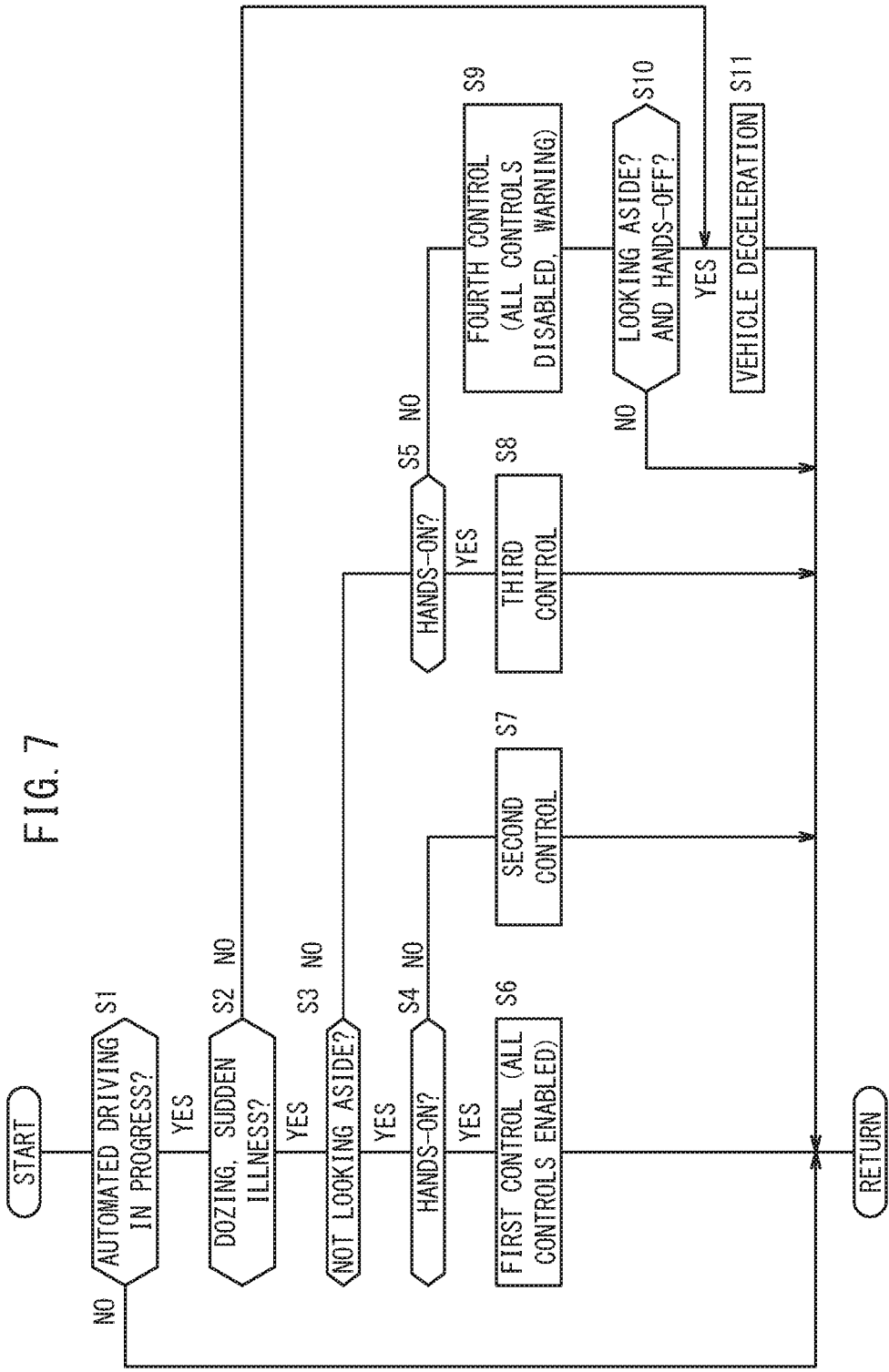

FIG. 8

| RECOGNITION RESULT | NOT LOOKING ASIDE | NOT LOOKING ASIDE | LOOKING ASIDE | LOOKING ASIDE | DOZING, SUDDEN ILLNESS |
|---|---|---|---|---|---|
| CONTACT SENSOR DETECTION RESULT | HANDS-ON | HANDS-OFF | HANDS-ON | HANDS-OFF | — |
| CONTROL TYPE | FIRST CONTROL | SECOND CONTROL | THIRD CONTROL | FOURTH CONTROL | — |
| START OF AUTOMATED DRIVING | START | NG | NG | NG | NG |
| RAMP TRAVELING | 0.3 G AUTOMATED STEERING | 0.2 G LANE KEEPING | 0.2 G LANE KEEPING | WARNING | STOP |
| AUTOMATED MERGING | MERGE | MERGE | WARNING | WARNING | STOP |
| LANE KEEPING | OK | AROUSAL OF INTEREST | OK | WARNING | STOP |
| LANE CHANGE | 0.3G | 0.2 G LIMIT | PROHIBITED | WARNING | STOP |
| AUTOMATED BRANCHING | BRANCHING | BRANCHING | WARNING | WARNING | STOP |
| AUTOMATED DRIVING END | END | WARNING | WARNING | WARNING, DECELERATION | STOP |

AUTOMATIC DRIVING CONTROL DEVICE

TECHNICAL FIELD

The present invention relates to an automated (automatic) driving control device in which a degree of automation in an automated control for a vehicle is changed in accordance with a state of the driver.

BACKGROUND ART

In Japanese Laid-Open Patent Publication No. 2007-168720, a system is disclosed in which a driving assist is stopped in the case that a decrease in a driving intention of the driver is recognized during a steering control driving assist.

SUMMARY OF INVENTION

In recent years, an automated driving control device has been developed having a higher degree of automated control than in a conventional driving assist. In an automated driving control device in which steering and acceleration/deceleration are automatically controlled, one object thereof is to enhance convenience by increasing the degree of automation. Provisionally, assuming that the driving assist technique shown in Japanese Laid-Open Patent Publication No. 2007-168720 were used in such an automated driving control device, the automated control of steering and acceleration/deceleration would be uniformly stopped in a specified situation. In this case, the convenience of automated driving cannot be ensured. In order to ensure the convenience of automated driving, it is necessary to dynamically change the degree of automation in the automated control depending on the situation.

The present invention has been devised taking into consideration the aforementioned problems, and has the object of providing an automated driving control device which is capable of ensuring the convenience of an automated control.

The present invention is characterized by an automated driving control device, comprising a recognition unit adapted to recognize a peripheral monitoring state of a driver, an automated controller adapted to terminate an automated control of steering and/or acceleration or deceleration, in the case that steering and/or acceleration or deceleration of a vehicle is being automatically controlled, and a switching operation is carried out to prioritize manual control of steering and/or acceleration or deceleration during the automated control, and a determination unit adapted to determine a state of ease of the switching operation, wherein the automated controller changes a degree of automation in the automated control, or a degree of change in vehicle behavior in the automated control, on the basis of the peripheral monitoring state recognized by the recognition unit, and the state of ease of the switching operation determined by the determination unit.

The present invention changes the degree of automation in the automated control or the degree of change in the vehicle behavior in the automated control, on the basis of the peripheral monitoring state of the driver, and the state of ease of the switching operation to prioritize the manual control over the automated control. In this manner, according to the present invention, the automated control of the steering and acceleration/deceleration is not stopped uniformly, but rather, the degree of automation or the degree of change in the vehicle behavior is changed dynamically, and therefore, it is possible to ensure the convenience of the automated control. Further, the peripheral monitoring state of the driver, and the state of ease of the operation to prioritize the manual control over the automated control reflect the intention of the driver to operate the vehicle. Therefore, according to the present invention, it is possible to set the degree of automation in accordance with the driver's intention to operate the vehicle.

In the present invention, the recognition unit may recognize, as the peripheral monitoring state, whether or not the driver is inattentive. In accordance with such a configuration, it is possible to recognize the intention of the driver to operate the vehicle by whether or not the driver is looking aside or is inattentive. Therefore, it is possible to set the degree of automation in accordance with the driver's intention to operate the vehicle.

In the present invention, the determination unit may determine, as the state of ease of the switching operation, whether or not the driver can immediately perform the manual control. In accordance with such a configuration, it is possible to determine the intention of the driver to operate the vehicle, depending on whether or not the driver can immediately perform the switching operation to prioritize the manual control over the automated control. Therefore, it is possible to set the degree of automation in accordance with the driver's intention to operate the vehicle.

In the present invention, the determination unit may determine, as the state of ease of the switching operation, whether or not the driver is contacting the steering wheel of the vehicle. In accordance with such a configuration, it is possible to determine the intention of the driver to operate the vehicle by whether or not the driver is contacting the steering wheel. Therefore, it is possible to set the degree of automation in accordance with the driver's intention to operate the vehicle.

In the present invention, the automated controller may prohibit a lane change by the automated control in the case that the inattentive state of the driver is recognized by the recognition unit, and it is determined by the determination unit that the driver is contacting the steering wheel. In accordance with such a configuration, even if the driver is contacting the steering wheel, if the driver is looking aside or is in attentive, the degree of automation is reduced. In this manner, in the case that the driver's intention to operate the vehicle is decreased, a portion of the functions of the automated control are restricted, and a portion of the functions are continued, whereby it is possible to ensure the convenience of automated driving. Further, it is possible to perform appropriate automated driving in accordance with the driver's intention to operate the vehicle.

In the present invention, the automated controller delays the execution speed of the lane change by the automated control, in the case that the inattentive state of the driver is not recognized by the recognition unit, and the determination unit determines that the driver is not contacting the steering wheel, compared to a case in which the inattentive state of the driver is not recognized by the recognition unit, and it is determined by the determination unit that the driver is contacting the steering wheel. In accordance with such a configuration, if the intention of the driver to operate the vehicle is decreased, the rate of change in the vehicle behavior is lowered in comparison with the case prior to the decrease. In this manner, in the case that the driver's intention to operate the vehicle is decreased, a portion of the functions of the automated control are restricted, and a portion of the functions are continued, whereby it is possible to ensure the convenience of automated driving. Further, it is possible to perform appropriate automated driving in accordance with the driver's intention to operate the vehicle.

In the present invention, there is further provided a warning device, wherein the automated controller operates the warning device and carries out deceleration by the automated control, in the case that the inattentive state of the driver is recognized by the recognition unit, and it is determined by the determination unit that the driver is not contacting the steering wheel. In accordance with such a configuration, in the case that the driver's intention to operate the vehicle cannot be confirmed, a warning is issued and the vehicle is decelerated. Therefore, in a situation in which manual control of the vehicle is required, the driver is prompted to pay attention, and further, higher safety can be ensured.

According to the present invention, the convenience of the automated control can be ensured. Further, it is possible to set the degree of automation in accordance with the driver's intention to operate the vehicle.

BRIEF DESCRIPTION OF DRAWINGS

FIG. 6A is a voltage waveform diagram of a human body and/or a virtual capacitor at a time of a hands-off state, and FIG. 6B is a voltage waveform diagram of a charging capacitor at the time of the hands-off state;

FIG. 7 is a flowchart of a degree of automation determination process;

FIG. 8 is a listing of the automated control content executed by an automated control device.

DESCRIPTION OF EMBODIMENTS

Figure 1:
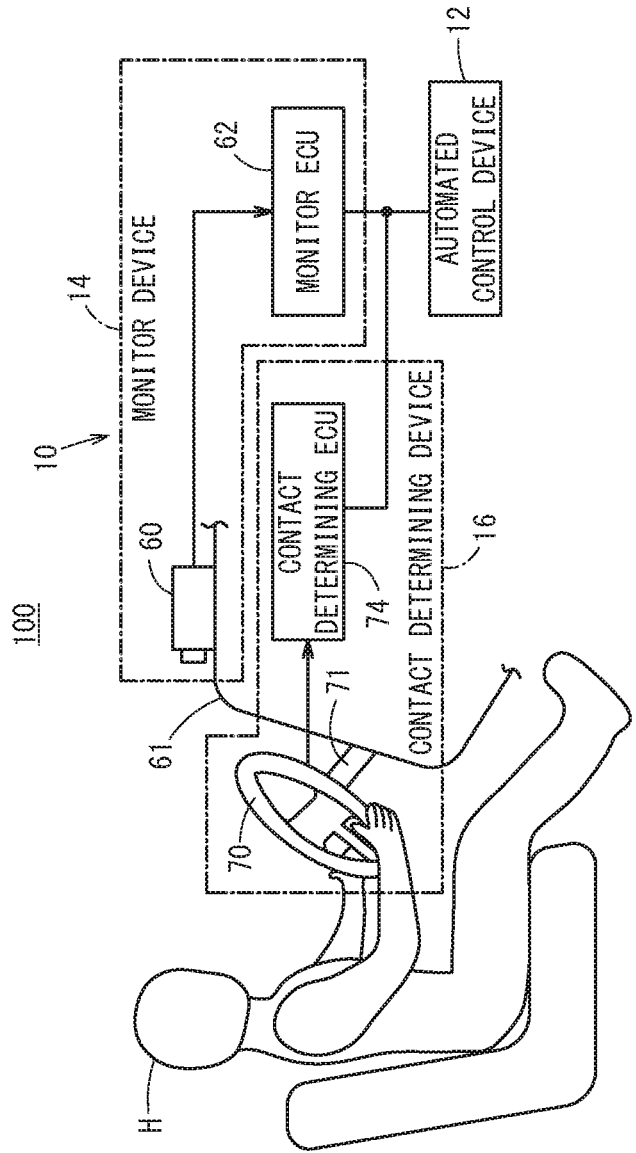
FIG. 1 is a configuration diagram of an automated driving control device according to a present embodiment.

Preferred embodiments of an automated driving control device according to the present invention will be described in detail below with reference to the accompanying drawings.

1. Definitions

In the present specification, a state (contact state) in which the driver (human body) is touching the steering wheel (contact sensor) is referred to as a "hands-on" state, and a state in which the driver (human body) is not touching the steering wheel (contact sensor) is referred to as a "hands-off" state.

In the present specification, the term "override" refers to temporarily prioritizing the manual control over the automated control, in a state in which the automated control is continued. Further, stopping the automated control and transferring the authority for driving from the vehicle to the driver is referred to as a "handover".

The peripheral monitoring state of the driver is divided into a state in which the driver is looking toward the front, a state in which the driver looks aside, and a state in which the driver is not looking at the periphery due to dozing or a sudden illness.

A switching operation that prioritizes a manual control (over an automated control) implies an override operation, and a state of ease of the switching operation implies a state of ease of the override operation. A state in which the switching operation is easy to perform is a state in which the driver can immediately perform a manual control. In the embodiment described below, the hands-on state is set to a state that facilitates the switching operation. Further, a state in which the switching operation is difficult to perform is a state in which the driver cannot immediately perform the manual control. In the embodiment described below, the hands-off state is set to a state that makes the switching operation difficult to perform.

The degree of automation in the automated control implies a degree of all of the automated controls which are permitted to be executed in relation to all of the automated controls that are capable of being executed. Further, the degree of change in the vehicle behavior implies an amount of change over time when the vehicle is accelerated or decelerated and is steered.

2. Configuration of Automated Driving Control Device 10

In the automated driving control device 10 according to the present embodiment, an automated control device 12 that automatically controls a vehicle 100 is equipped with a monitor device 14 for monitoring the driver H, and a contact determining device 16 that determines the presence or absence of contact of the driver H with respect to the steering wheel 70. The monitor device 14 distinguishes between and recognizes the peripheral monitoring state of the driver H (which in this instance is a presence or absence of inattention), dozing, sudden illness, and the like. The contact determining device 16 determines an ease of an override operation, which in this instance, is a hands-on state or a hands-off state.

3. Configuration of Automated Control Device 12

Figure 2:
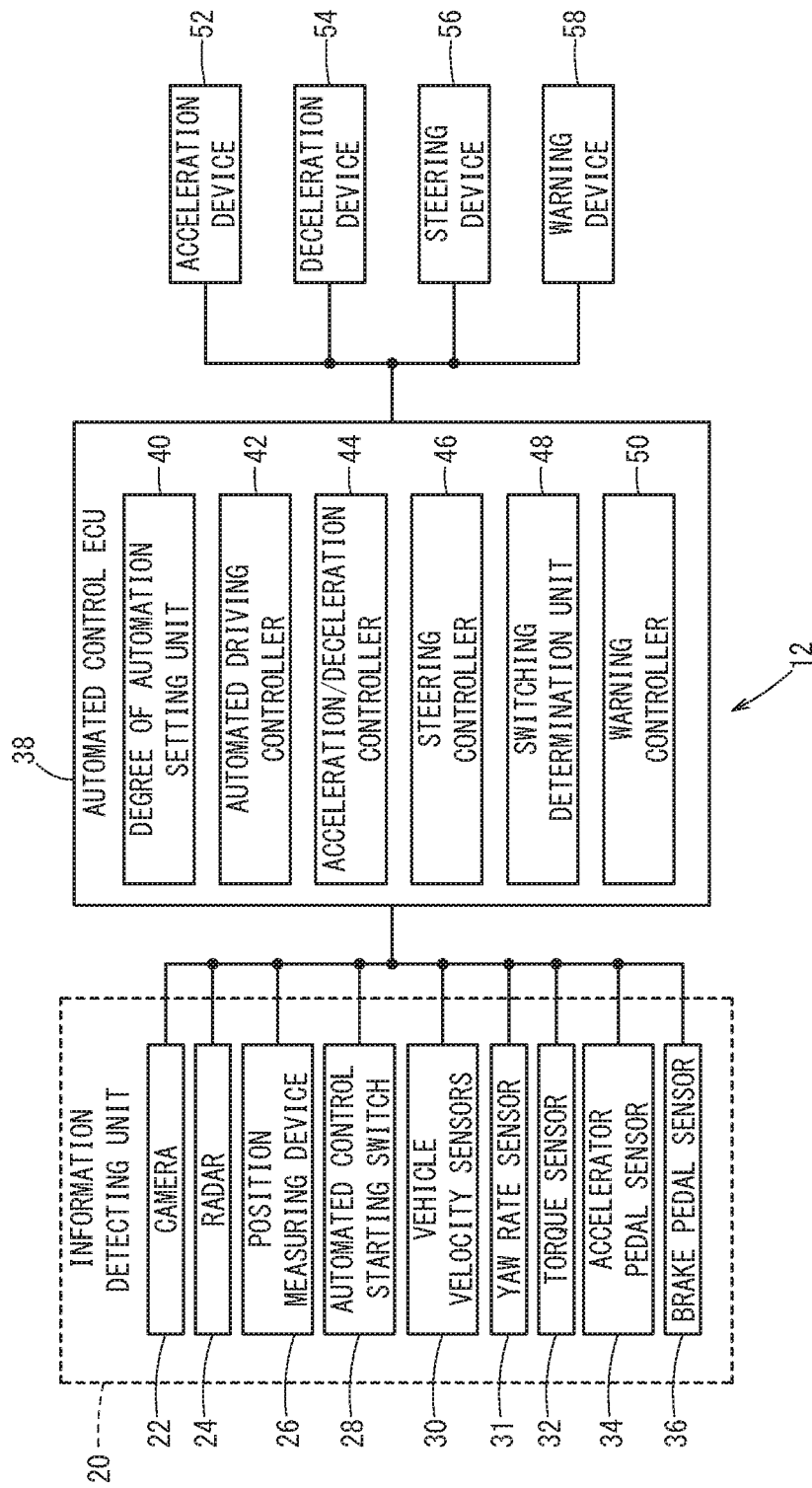
FIG. 2 is a block diagram of an automated control device according to the present embodiment.

As shown in FIG. 2, the automated control device 12 comprises an information detecting unit 20, an automated control ECU 38, and controlled devices 52, 54, 56, 58.

The information detecting unit 20 is made up from devices (sensors, switches, etc.) for acquiring information necessary for executing the automated control. The information detecting unit 20 includes, for example, a camera 22, a radar 24, a position measuring device 26, an automated control starting switch 28, vehicle velocity sensors 30, a yaw rate sensor 31, a torque sensor 32, an accelerator pedal sensor 34, and a brake pedal sensor 36.

For example, the camera 22 is installed on an upper part on an inner side of the front windshield of the vehicle 100, and captures images ahead of the vehicle 100. As the camera 22, a monocular camera or a stereo camera can be used. For example, the radar 24 is installed on a front grill of the vehicle 100, and irradiates electromagnetic waves around the periphery of the vehicle 100, and detects reflected waves. As the radar 24, a radar device such as a millimeter wave radar, a microwave radar, a laser radar, or the like can be used, or an infrared sensor can also be used. Moreover, it is also possible to use a fusion sensor which combines the imaging information from the camera 22 and the detected information from the radar 24. The position measuring device 26 measures the position of the vehicle 100, and is equipped with a satellite positioning system and a gyroscope or the like for inertial navigation, and a storage unit in which map information is stored including information of segments in which automated driving is possible.

The automated control starting switch 28 is disposed in the vicinity of the driver's seat, and is operated by the driver H who intends to initiate an automated control. The vehicle velocity sensors 30 are provided in each of the vehicle wheels (not shown) of the vehicle 100, and detect the traveling velocity of the vehicle 100.

The yaw rate sensor 31 detects a yaw rate of the vehicle 100. The torque sensor 32 detects, for example, a steering torque which is generated in a steering shaft 71 (see FIG. 1). The accelerator pedal sensor 34 detects an amount at which an accelerator pedal (not shown) is depressed. As the accelerator pedal sensor 34, a stroke sensor or a pressure sensor can be used. The brake pedal sensor 36 detects an amount at which a brake pedal (not shown) is depressed. As the brake pedal sensor 36, a stroke sensor or a pressure sensor can be used.

The automated control ECU 38 is a computational device including a microcomputer, and further includes a CPU, a ROM (including an EEPROM), a RAM, and in addition thereto, input/output devices such as an A/D converter, a D/A converter and the like, and a timer that serves as a timekeeping unit. By reading out and executing programs stored in the ROM, the automated control ECU 38 functions as various function realizing units, such as a control unit, a computation unit, a processing unit, and the like. The function realizing units can also be configured in the form of hardware (function implementing devices). The automated control ECU 38 may be constituted from only one ECU, or may be constituted from a plurality of ECUs. Each of the respective ECUs (a monitor ECU 62 and a contact determining ECU 74), to be described later, is configured in the same manner as the automated control ECU 38.

By the CPU executing the aforementioned programs, the automated control ECU 38 functions as a degree of automation setting unit 40, an automated driving controller 42, an acceleration/deceleration controller 44, a steering controller 46, a switching determination unit 48, and a warning controller 50.

The degree of automation setting unit 40 is configured in a manner so as to determine a degree of automation in the automated control, or a degree of change in the vehicle behavior in the automated control, on the basis of a recognition result of the monitor device 14, and a determination result of the contact determining device 16.

The automated driving controller 42 is configured to acquire from the information detecting unit 20 information necessary for automated driving, and to formulate action plans for the vehicle 100. For example, the automated driving controller 42 sets a travel route to a destination. Further, the automated driving controller 42 is constituted in a manner so as to set a travel line, and determine vehicle velocity information, acceleration/deceleration information, and steering information in order to cause the vehicle 100 to travel along the travel line. The action plans are devised within a range of the degree of automation or the degree of change in the vehicle behavior that was determined by the degree of automation setting unit 40.

The acceleration/deceleration controller 44 is configured to execute the acceleration/deceleration control on the basis of vehicle velocity information and acceleration/deceleration information, which are determined by the automated driving controller 42. The acceleration/deceleration controller 44 outputs acceleration instructions with respect to an acceleration device 52, and outputs deceleration instructions with respect to a deceleration device 54. The steering controller 46 is configured in a manner so as to execute a steering control on the basis of steering information determined by the automated driving controller 42. The steering controller 46 outputs steering instructions with respect to a steering device 56.

The switching determination unit 48 is configured so as to perform, on the basis of the information acquired from the information detecting unit 20, a stop or a temporary stop determination of the control assist in the automated control. For example, there may be cases during the automated control, and more specifically during automated driving, in which the driver H desires to carry out an acceleration/deceleration control by way of a manual control. In this case, the driver H operates the brake pedal (or the accelerator pedal). This is an override operation. At this time, the brake pedal sensor 36 (the accelerator pedal sensor 34) detects the override operation. In accordance with a detection signal output from the brake pedal sensor 36, the switching determination unit 48 instructs the automated driving controller 42 to temporarily stop (override) the acceleration/deceleration control. As a result, the driver H becomes capable of performing the acceleration/deceleration operation by her/himself.

Further, there may be cases during the automated control, and more specifically during automated driving, in which the driver H desires to carry out a steering control by way of a manual control. In this case, the driver H operates the steering wheel 70. This is also an override operation. At this time, the torque sensor 32 detects the steering torque TR. In the case that the steering torque TR detected by the torque sensor 32 becomes greater than or equal to an override threshold value TRth, the switching determination unit 48 instructs the automated driving controller 42 to temporarily stop (override) the steering control. As a result, the driver H becomes capable of performing the steering operation by her/himself.

Further, the switching determination unit 48 determines whether or not to transfer the authority for driving from the vehicle 100 to the driver H, or stated otherwise, whether or not a handover is required. For example, when an override operation related to the acceleration/deceleration control and an override operation related to steering are performed within a predetermined time period, the switching determination unit 48 instructs the automated driving controller 42 to stop the automated control (to perform the handover). Further, in the case that the vehicle 100 comes into proximity to an end position of automated driving, the switching determination unit 48 instructs the automated driving controller 42 to stop the automated control (to perform the handover).

The warning controller 50 is configured in a manner so as to output a warning instruction on the basis of the information acquired by the information detection unit 20, the recognition result of the monitor device 14, the determination result of the contact determining device 16, and the control content determined by the degree of automation setting unit 40.

The acceleration device 52 operates a drive source of the vehicle 100 in accordance with an acceleration instruction output from the automated control ECU 38. In the case that the vehicle 100 is an engine vehicle, a throttle valve or the like is operated in accordance with the acceleration instruction, and thereby operates the drive source (engine). In the case that the vehicle 100 is an electric vehicle including an electric motor, the drive source (electric motor) is operated in accordance with the acceleration instruction. Upon doing so, the vehicle 100 accelerates. The deceleration device 54 operates a brake actuator in accordance with a deceleration instruction output from the automated control ECU 38, and thereby operates the brake. Upon doing so, the vehicle 100 decelerates. The steering device 56 operates an electric motor for electric power steering in accordance with a steering instruction output from the automated control ECU 38. The electric motor rotates the steering shaft 71. Upon doing so, the vehicle 100 changes course. The warning device 58 operates a speaker and/or a display in response to a warning instruction output from the automated control ECU 38, and thereby issues a warning. Furthermore, such a warning may be issued by vibrating the steering shaft 71, a seat belt, the accelerator pedal, or the like.

4. Configuration of Monitor Device 14

Figure 3:
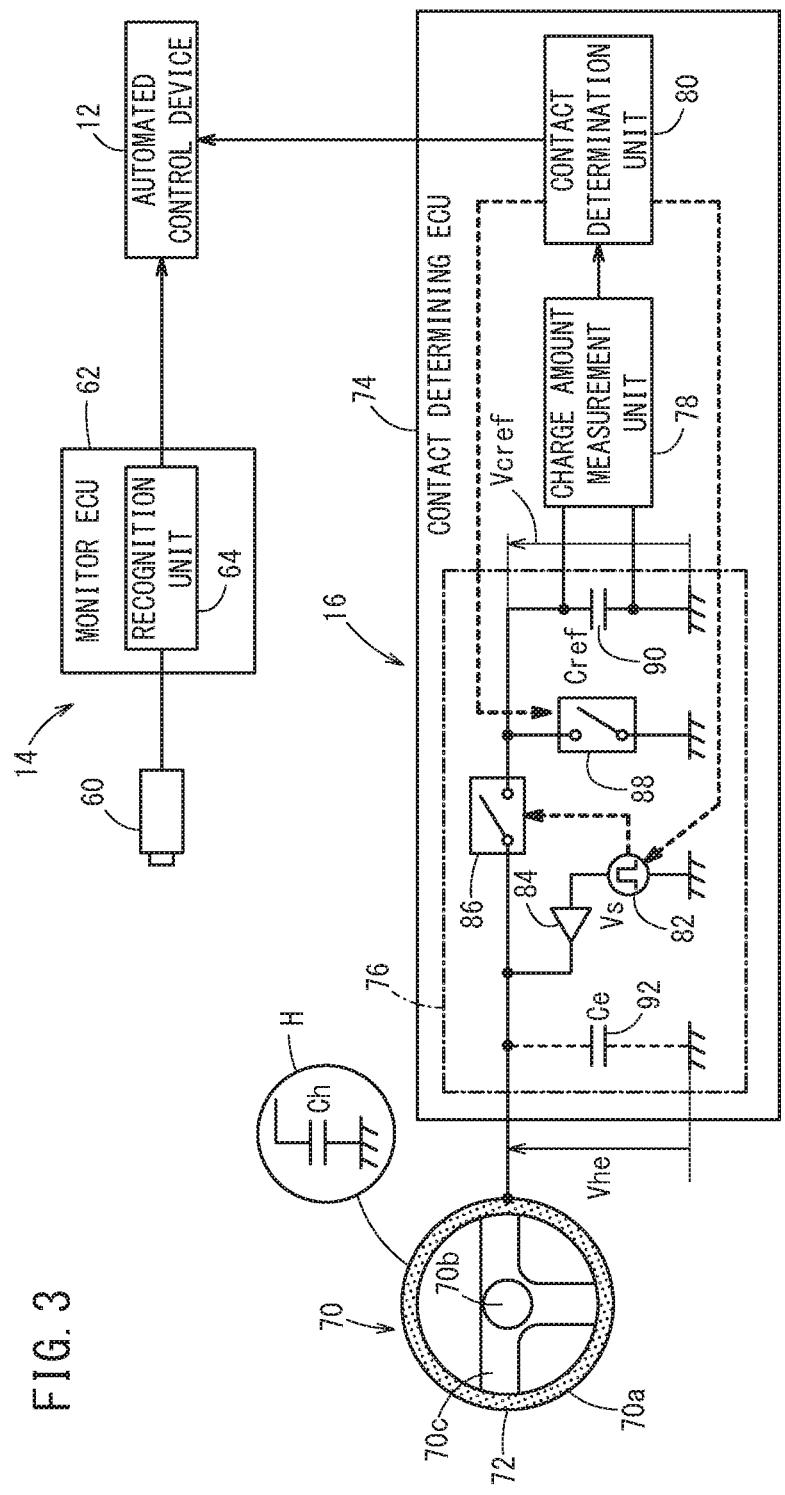
FIG. 3 is a block diagram of a monitor device and a contact determining device according to the present embodiment.

As shown in FIG. 3, the monitor device 14 comprises a driver camera 60 and a monitor ECU 62.

The driver camera 60 is disposed, for example, in a dashboard 61 (see FIG. 1) or a meter panel (not shown), and captures images of the face or the upper body of the driver H. A near infrared camera can be used as the driver camera 60.

In the same manner as the automated control ECU 38, the monitor ECU 62 is a computation device including a microcomputer. The configuration of the ECU is as described previously.

By the CPU executing a program, the monitor ECU 62 functions as a recognition unit 64. The recognition unit 64 is configured in a manner so as to recognize the peripheral monitoring state of the driver H by analyzing images captured by the driver camera 60. In this instance, a degree of the periphery monitored by the driver H is recognized as the peripheral monitoring state. The monitored degree of periphery is recognized based on the posture, the facial orientation, the orientation of the eyeballs, the closed condition of the eyelids, etc., of the driver H. For example, the eyelids of the driver H are recognized, and if the eyelids are closed, it is recognized that the driver is dozing. Further, the driver H is recognized as suffering from a sudden illness in the case that the posture of the driver H is recognized, and the driver H has fallen over to one of the front, rear, left, or right. Further, the face or the eyeballs of the driver H are recognized, and in the case of being oriented toward the left or right, a state of inattentiveness is recognized. As the method of recognition, it is possible to use a known method such as a method of using feature points or pattern matching. The recognition result of the recognition unit 64 is output to the automated control device 12.

5. Configuration of Contact Determining Device 16

As shown in FIG. 3, the contact determining device 16 comprises the steering wheel 70 and the contact determining ECU 74.

The steering wheel 70 constitutes a portion of the steering device 56 that is operated by the driver H when the vehicle 100 is traveling. Generally, the steering wheel 70 includes a rim portion 70a formed in an annular shape, a hub portion 70b connected to the steering shaft 71 (see FIG. 1), and spoke portions 70c interposed between the rim portion 70a and the hub portion 70b. As will be discussed later, a contact sensor 72 is formed in the rim portion 70a.

The rim portion 70a is a laminated structure the cross section of which is made up from a plurality of layers. As an example, the rim portion 70a is equipped with an annular core metal, a resin member, and a leather member, provided in this order toward a radial outer side from a cross-sectional center portion. The core metal constitutes a skeletal structure of the rim portion 70a. The resin member is formed in a generally circular cross-sectional shape or an elliptical cross-sectional shape, and covers the entire surface of the metal core with a sufficient thickness, and thereby defines the overall shape of the rim portion 70a. The leather member covers the entire surface of the resin member.

A contact sensor 72 (the dotted portion shown in FIG. 3), which is made up from a conductive material, is formed on the surface of the leather member, and furthermore, a protective film is coated over the entirety of the rim portion 70a. The protective film does not insulate or electrically isolate the surface of the contact sensor 72. The contact sensor 72 is formed, for example, by application of a conductive paint, and covers substantially the entire surface of the leather member. The contact sensor 72 is an electrostatic capacitance sensor which, in the case of the hands-on state, utilizes the driver H (human body H) as a capacitor of an electrostatic capacitance Ch.

Moreover, the contact sensor 72 may be provided only on a front side (in a rearward direction of the vehicle), may be provided only on a rear side (in a frontward direction of the vehicle), and may be provided only on side surfaces (in a widthwise direction of the vehicle) of the steering wheel 70. Further, the contact sensor 72 may be divided into a plurality of sensors. In such a case, each of the contact sensors 72 is connected to a later-described contact measurement circuit 76. The contact sensor 72 may be formed around the entire circumference of the steering wheel 70, or may be formed partially therearound. The contact sensor 72 may be a conductive sheet rather than a conductive coating.

In the same manner as the automated control ECU 38, the contact determining ECU 74 is a computation device including a microcomputer. The configuration of the ECU is as described previously.

The contact determining ECU 74 is equipped with a contact measurement circuit 76, a charge amount measurement unit 78, and a contact determination unit 80. FIG. 3 shows an equivalent circuit of the contact measurement circuit 76. The contact measurement circuit 76 includes a pulse power source 82, an amplifier 84, a first switch 86, a second switch 88, and a charging capacitor 90 having a static capacitance Cref. Further, in the contact measurement circuit 76, a stray capacitance Ce exists inherently in the respective components, the wiring, etc. In this instance, the respective components, the wiring, etc., are regarded as a virtual capacitor 92 of the stray capacitance Ce. The electrostatic capacitance Cref of the charging capacitor 90 is set to be sufficiently larger than the stray capacitance Ce and the electrostatic capacitance Ch of the human body H.

The pulse power source 82 and the amplifier 84 are connected in series. The second switch 88 and the charging capacitor 90 are connected in parallel. Furthermore, a series circuit made up from the pulse power source 82 and the amplifier 84 is connected to one end of the first switch 86, and a parallel circuit made up from the second switch 88 and the charging capacitor 90 is connected to the other end of the first switch 86. In addition, an output end of the amplifier 84, the one end of the first switch 86, and the contact sensor 72 are electrically connected.

The pulse power source 82 supplies a constant pulse voltage Vs at a predetermined frequency in accordance with a power supply instruction from the contact determination unit 80. The amplifier 84 amplifies the pulse voltage Vs that is supplied from the pulse power source 82. The first switch 86 is placed in an energized state in accordance with a rise, and is placed in a non-energized state in accordance with a fall in the pulse voltage Vs of the pulse power source 82. A MOSFET, for example, is used as the first switch 86. The second switch 88 is placed in an energized state in accordance with an ON signal, and is placed in a non-energized state in accordance with an OFF signal, which are output from the contact determination unit 80, as will be described later. By the first switch 86 being placed in the energized state, the charging capacitor 90 stores the charge that is accumulated in the human body H. Further, by the second switch being placed in the energized state, the electric charge is discharged to ground G. Detailed operations of the contact measurement circuit 76 will be described in section [6.1] below.

The charge amount measurement unit 78 is configured in a manner so as to measure the charging voltage Vcref of the charging capacitor 90. The contact determination unit 80 is configured in a manner so as to periodically (for example, every several ten to several hundred milliseconds) output a power supply instruction and a power supply stop instruction with respect to the pulse power source 82 disposed in the contact measurement circuit 76. The contact determination unit 80 is further configured in a manner so as to monitor the number of pulses N (referred to as a pulse number N) generated by the pulse power source 82, and the charging voltage Vcref of the charging capacitor 90 as measured by the charge amount measurement unit 78. In addition, the contact determination unit 80 is configured in a manner so as to compare (Nj:Nth) the number of pulses Nj required until the charging voltage Vcref reaches a predetermined charging voltage threshold value Vcth (judgment threshold value) with a pulse threshold value Nth, and to determine whether the hands-on state or the hands-off state is taking place. The determination result of the contact determination unit 80 is output to the automated control device 12.

6. Description of Contact Determination Executed by Contact Determining Device 16

[6.1. Operations of Contact Measurement Circuit 76]

The contact determining device 16 performs a contact determination on the basis of the charging result of the charging capacitor 90 which is carried out by the contact measurement circuit 76. Before describing the contact determination, operations of the contact measurement circuit 76 will be described with reference to FIGS. 4A to 4C and FIGS. 5A and 5B. In this instance, a description will be made assuming the hands-on state, that is, a state in which the driver H (human body H) is touching the contact sensor 72.

Figure 4A:
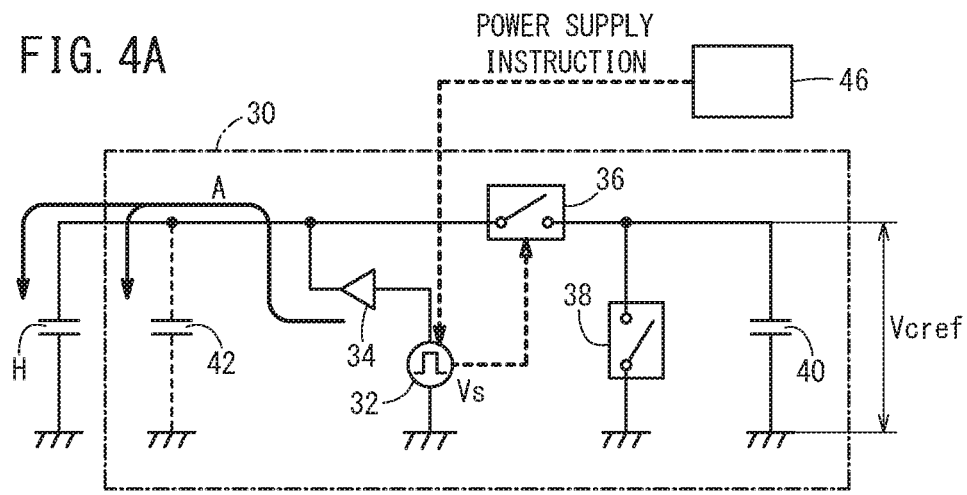
FIGS. 4A to 4C are diagrams for explaining operations of a contact measurement circuit.

In each instance of a predetermined period, a power supply instruction is output from the contact determination unit 80 with respect to the pulse power source 82. The supply of power by the pulse power source 82 is initiated in response to the power supply instruction. When the pulse voltage Vs of the pulse power source 82 rises, as shown in FIG. 4A, the first switch 86 is placed in a non-conductive state. At this time, the electric charge moves in the direction indicated by the arrow A. Upon doing so, the voltage Vhe of the human body H and the virtual capacitor 92 rises, as shown at time t1 in FIG. 5A. Stated otherwise, the human body H and the virtual capacitor 92 are charged.

Figure 4B:
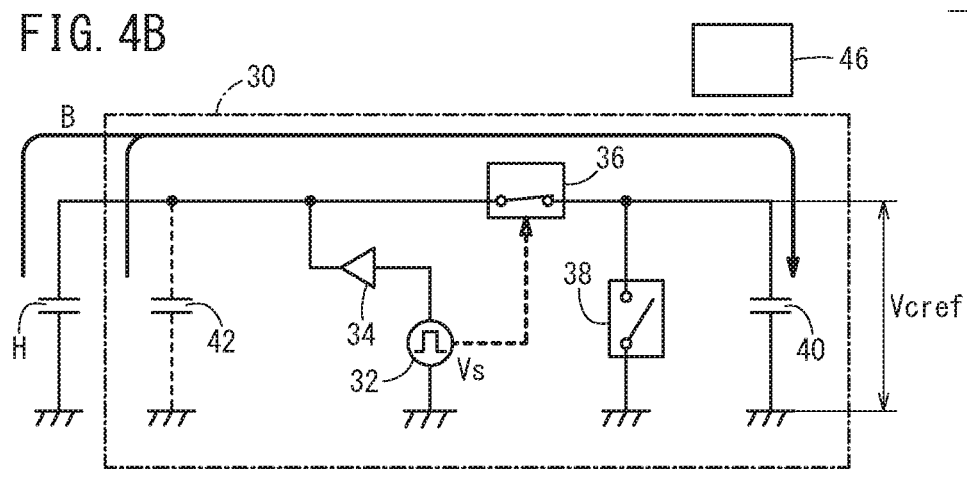

Next, when the pulse of the pulse power source 82 falls, as shown in FIG. 4B, the first switch 86 is placed in a conductive state. At this time, the electric charge accumulated in the human body H and the virtual capacitor 92 moves in the direction indicated by the arrow B. Upon doing so, the voltage Vhe of the human body H and the virtual capacitor 92 decreases, as shown at time t2 in FIG. 5A. Stated otherwise, the human body H and the virtual capacitor 92 are discharged. On the other hand, the voltage Vcref of the charging capacitor 90 rises, as shown at time t2 in FIG. 5B. Stated otherwise, the charging capacitor 90 is charged. As was noted previously, the electrostatic capacitance Cref of the charging capacitor 90 is sufficiently larger than the stray capacitance Ce and the electrostatic capacitance Ch of the human body H, and therefore, the majority of the charge accumulated in the human body H and the virtual capacitor 92 moves to the charging capacitor 90.

Figure 5A:
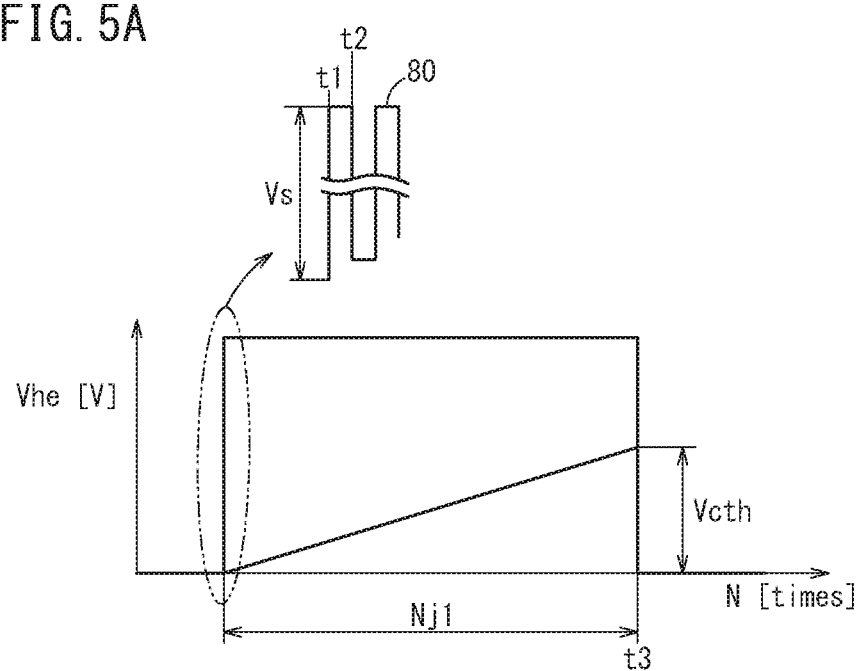
FIG. 5A is a voltage waveform diagram of a human body and/or a virtual capacitor at a time of a hands-on state.
Figure 5B:
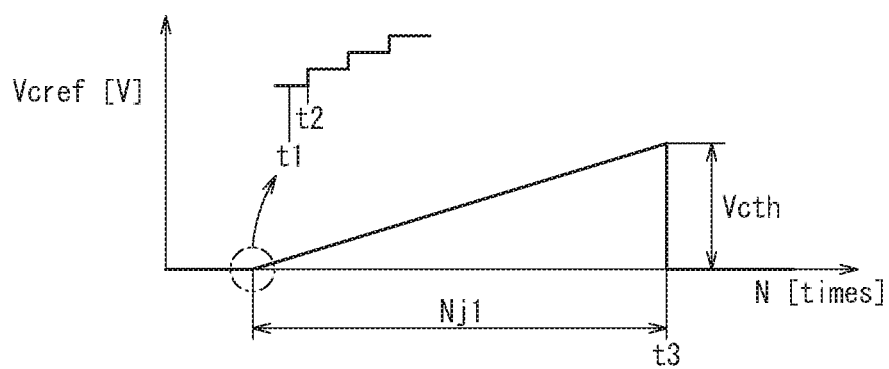
FIG. 5B is a voltage waveform diagram of a charging capacitor at the time of the hands-on state.

Thereafter, in accordance with the rise in the pulse voltage Vs, the human body H and the virtual capacitor 92 are charged (see FIG. 4A), whereas in accordance with the fall in the pulse voltage Vs, the charging capacitor 90 is charged (see FIG. 4B). As shown in FIG. 5B, as the number of pulses N increases, the charge amount of the charging capacitor 90 increases, and the charging voltage Vcref increases.

Figure 4C:
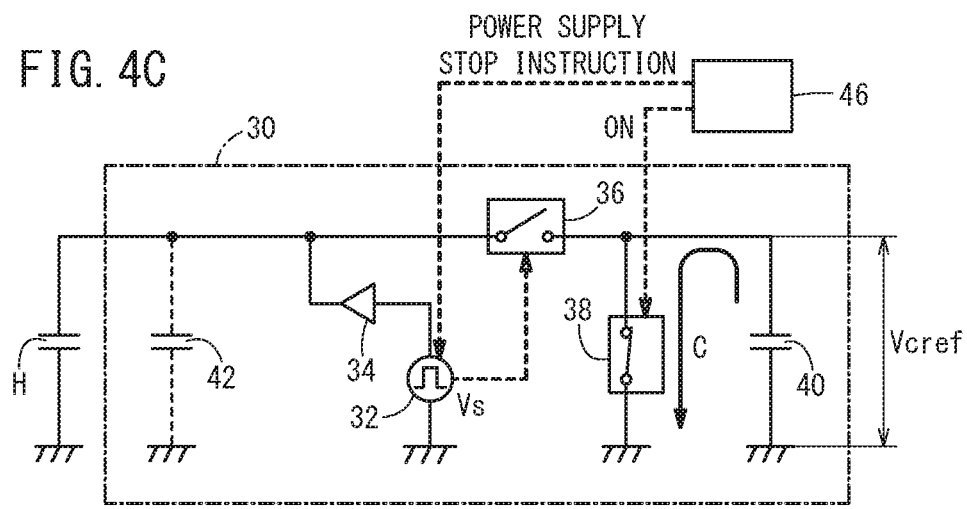

As shown in FIG. 5B, at a point in time when the number of pulses N is the number of pulses Nj1, the charging voltage Vcref of the charging capacitor 90 reaches the charging voltage threshold value Vcth. At this time, as shown in FIG. 4C, a power supply stop instruction is output from the contact determination unit 80 with respect to the pulse power source 82, and supplying of power by the pulse power source 82 is stopped. Furthermore, an ON signal is output with respect to the second switch 88 from the contact determination unit 80. Upon doing so, the second switch 88 is placed in a conductive state. At this time, the electric charge accumulated in the charging capacitor 90 moves in the direction indicated by the arrow C. Stated otherwise, the charging capacitor 90 is discharged. After completion of the discharge, an OFF signal is output with respect to the second switch 88 from the contact determination unit 80. Upon doing so, the second switch 88 is placed in a non-conductive state. Thus, the state of FIG. 4A is restored. The processes described above are performed repeatedly.

In this instance, although the description was made assuming the case of the hands-on state, in the case of the hands-off state, the basic operations are the same as those described above, with the exception that there is no electric charge accumulated in the human body H. However, as will be described in section [6.3] below, the number of pulses Nj2 at the time of the hands-off state (refer to FIGS. 6A and 6B) becomes longer than the number of pulses Nj1 at the time of the hands-on state.

[6.2. Electrostatic Capacitance Ch of Human Body H]

The electrostatic capacitance Ch of the human body H is developed in the following manner. Moreover, in order to facilitate explanation thereof, in the following description, the stray capacitance Ce of the virtual capacitor 92 is not taken into consideration.

The charge $\Delta Q$ accumulated in the human body H by one pulse of the pulse power source 82 is expressed by the following equation (1).

$$\Delta Q = Vs \times Ch \tag{1}$$

Since the electrostatic capacitance Cref of the charging capacitor 90 is sufficiently large in comparison with the electrostatic capacitance Ch of the human body H, when the first switch 86 is placed in a conductive state as shown in FIG. 4B, the majority of the charge ΔQ moves to the charging capacitor 90. Therefore, the following equation (2) is satisfied, and when the form of equation (2) is modified, the following equation (2)' is satisfied.

$$\Delta Q = Cref \times \Delta Vcref \quad (2)$$

$$\Delta Vcref = \Delta Q / Cref \quad (2)'$$

Assuming that accumulation and movement of charges are repeated N times, and the charging voltage threshold value Vcth is reached, the following equation (3) is satisfied.

$$Vcth = \Delta Vcref \times N \quad (3)$$

Substituting the aforementioned equation (1) and the aforementioned equation (2)' into the above equation (3), the following equation (4) is satisfied.

$$Vcth = \Delta Q / Cref \times N = Vs \times Ch / Cref \times N \quad (4)$$

From the above equation (4), the following equation (5) is obtained.

$$Ch = (Vcth/Vs) \times (Cref/N) \quad (5)$$

As described above, the electrostatic capacitance Ch of the human body H is determined by the charging voltage threshold value Vcth, the voltage Vs of the pulse power source 82, the static capacitance Cref of the charging capacitor 90, and the number of pulses N. Moreover, the electrostatic capacitance Ch varies depending on the contact area between the human body H and the contact sensor 72. Therefore, by measuring the electrostatic capacitance Ch, it is possible to estimate whether the human body H is contacting the steering wheel 70 (contact sensor 72), or is grasping the steering wheel 70, and further, whether a two-handed grip or a one-handed grip is being made.

[6.3. Contact Determination Method]

Whether the driver H (human body H) is touching the contact sensor 72, and more specifically, whether a hands-on or a hands-off state is taking place, is determined by the number of pulses Nj required until the charging voltage Vcref of the charging capacitor 90 reaches the charging voltage threshold value Vcth. For example, in the case of the hands-off state, the charge amount ΔQ1 that is charged by one pulse supplied from the pulse power source 82 is given by ΔQ1=Ce×Vs=Cref×Vcref, and the voltage Vcref rises by a level given by Vcref=(Vs/Cref)×Ce. On the other hand, in the case of the hands-on state, the charge amount ΔQ2 that is charged by one pulse supplied from the pulse power source 82 is given by ΔQ2=(Ce+Ch)×Vs=Cref×Vcref, and the voltage Vref rises by a level given by Vcref=(Vs/Cref)×(Ce+Ch). In this manner, the hands-off state and the hands-on state differ in terms of the voltage that rises with one supply of power. For this reason, the hands-on case arrives at the charging voltage threshold value Vcth in a shorter time period (the number of pulses N is smaller) than in the hands-off case. According to the present embodiment, the pulse threshold value Nth is set and it is determined that the hands-on state is taking place in the case that the number of pulses Nj required to reach the charging voltage threshold value Vcth is smaller than the pulse threshold value Nth, and it is determined that the hands-off state is taking place in the case that the number of pulses Nj is greater than the pulse threshold value Nth.

7. Process Performed by Automated Driving Control Device 10

A degree of automation determination process performed by the automated driving control device 10 will be described with reference to FIGS. 2, 3, and 7. As a premise of the operations shown in FIG. 7, the monitor ECU 62 of the monitor device 14 periodically recognizes the peripheral monitoring state of the driver H. Further, the contact determining ECU 74 of the contact determining device 16 periodically determines, according to the operations described in the above section [6.1] and the determination method described in the above section [6.3], whether the hands-on state or the hands-off state is taking place. In the case of having determined the hands-off state, a time period is measured by the timer from the point in time at which the hands-off state is started.

In step S1, in the case that automated driving is in progress (step S1: YES), the processes from step S2 and thereafter are executed. On the other hand, in the case that automated driving is not in progress (step S1: NO), the processes from step S2 and thereafter are not executed.

In step S2, a determination is made as to whether or not the driver H is dozing, or whether or not the driver is suffering from a sudden illness. On the basis of the recognition result of the recognition unit 64, the degree of automation setting unit 40 determines whether or not the driver H is dozing or is suffering from a sudden illness. In the case that the driver H is not dozing and is not suffering from a sudden illness (step S2: YES), the process proceeds to step S3. On the other hand, in the case that the driver H is dozing or is suffering from a sudden illness (step S2: NO), the process proceeds to step S11.

In step S3, the peripheral monitoring state of the driver H is determined. On the basis of the recognition result of the recognition unit 64, the degree of automation setting unit 40 determines whether or not the driver H is looking aside. In the case that the driver H is not looking aside (step S3: YES), the process proceeds to step S4. On the other hand, in the case that the driver H is looking aside (step S3: NO), the process proceeds to step S5.

In step S4, it is determined whether a hands-on state or a hands-off state is taking place. The degree of automation setting unit 40 determines whether the hands-on state or the hands-off state is taking place on the basis of the determination result of the contact determination unit 80. In the case of the hands-on state (step S4: YES), the process proceeds to step S6. On the other hand, in the case of the hands-off state (step S4: NO), the process proceeds to step S7.

Similar to step S4, in step S5 as well, it is determined whether the hands-on state or the hands-off state is taking place. In the case of the hands-on state (step S5: YES), the process proceeds to step S8. On the other hand, in the case of the hands-off state (step S5: NO), the process proceeds to step S9.

In step S6, the degree of automation setting unit 40 sets, as the degree of automation, a first control which is described in the following section [8], and executes an automated control within a range of the first control. Then, the process returns to START.

In step S7, the degree of automation setting unit 40 sets, as the degree of automation, a second control which is described in the following section [8], and executes an automated control within a range of the second control. Then, the process returns to START.

In step S8, the degree of automation setting unit 40 sets, as the degree of automation, a third control which is described in the following section [8], and executes an automated control within a range of the third control. Then, the process returns to START.

In step S9, the degree of automation setting unit 40 sets, as the degree of automation, a fourth control which is described in the following section [8], and executes an automated control within a range of the fourth control. The process then proceeds to step S10.

In step S10, once again, the peripheral monitoring state of the driver H, and whether or not the driver H is in a hands-on state or a hands-off state are determined. In the case that the driver H is still looking aside and is in a hands-off state (step S10: YES), the process proceeds to step S11. On the other hand, in the case that the driver H is not looking aside or is in a hands-on state (step S10: YES), the process returns to START. In step S11, the acceleration/deceleration controller 44 decelerates (or stops) the vehicle 100.

8. Degree of Automation in First Control to Fourth Control

With reference to FIG. 8, the first control to the fourth control, which were noted in section [7] above, will be described. FIG. 8 shows an example of the content of the automated control (first control to fourth control, and control at a time of dozing or sudden illness) executed by the automated control device 12 in respective traveling scenarios of the vehicle 100. In FIG. 8, the term "warning" implies issuing a warning with respect to the driver H by way of voice or a display to thereby prompt the driver H to look directly ahead and/or to assume a hands-on state. Further, the term "deceleration" implies decelerating the vehicle 100 by way of an automated control, and the term "stop" implies immediately stopping the vehicle 100 by way of an automated control.

In FIG. 8, that which is described in the line of "automated driving start" is control content executed by the automated control ECU 38 in a situation of starting automated driving. The term "start" shown in this instance implies that starting is possible at a time of starting the automated control. Stated otherwise, in the case that a starting instruction is received, the automated control ECU 38 starts the automated control. Further, the term "NG" implies that starting cannot be performed at the time of starting the automated control. Stated otherwise, in the case that a starting instruction is received, the automated control ECU 38 does not start the automated control.

Figure 9:
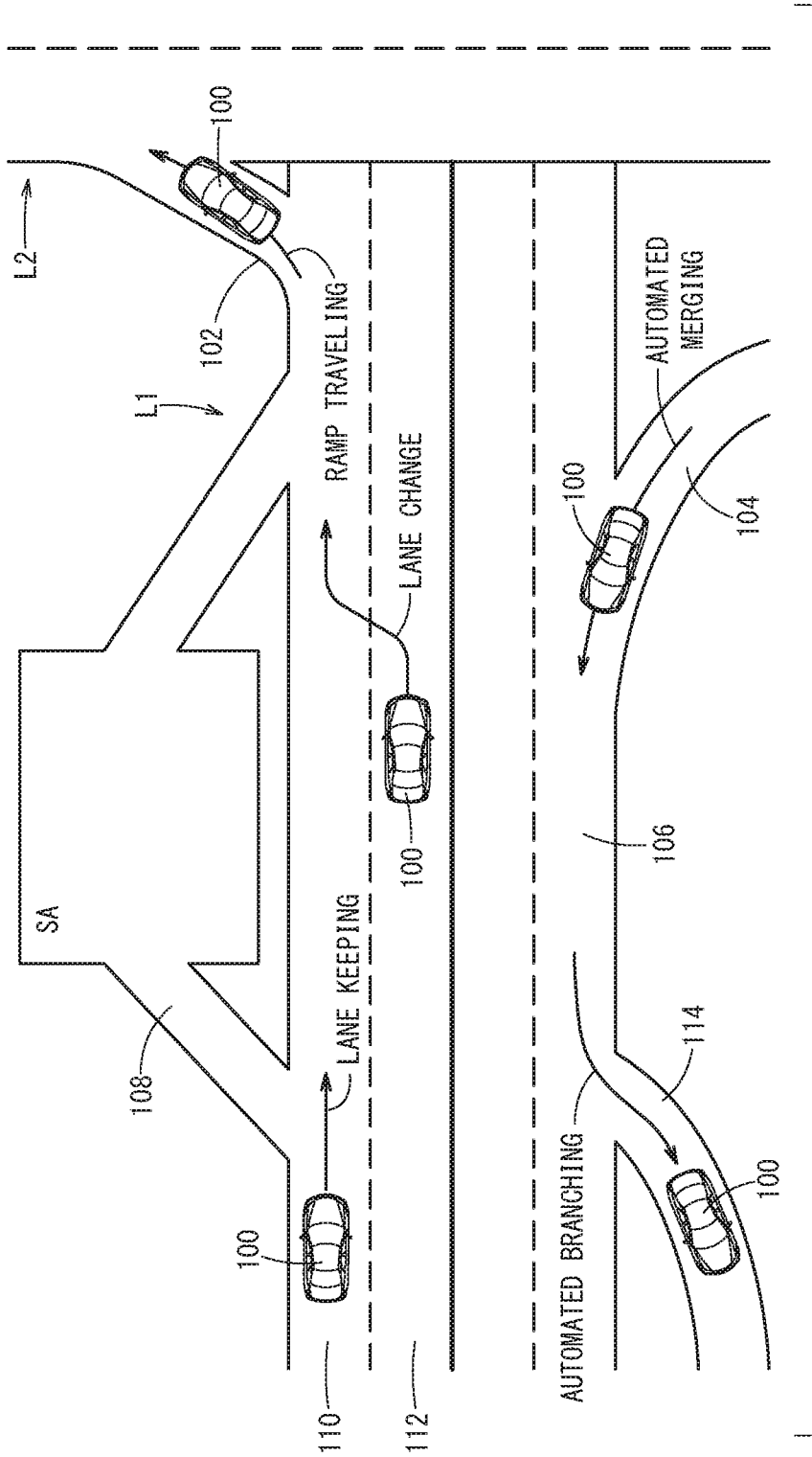
FIG. 9 is an explanatory diagram of a traveling scenario of a vehicle.

In FIG. 8, that which is described in the line of "ramp traveling" is control content executed by the automated control ECU 38 in a situation in which the vehicle 100 is traveling on a ramp 102, as shown in FIG. 9. The term "0.3 G automated steering" shown in this instance implies an automated steering control in which a lateral G upper limit value at a time of turning is 0.3 G. Further, the term "0.2 G lane keeping" implies a lane keeping control in which a lateral G upper limit value at a time of turning is 0.2 G. The lane keeping control is a steering control in which the vehicle is maintained approximately in the center of the travel lane.

In FIG. 8, that which is described in the line of "automated merging" is control content executed by the automated control ECU 38 in a situation in which the vehicle 100 merges from a merging lane 104 into a main lane 106, as shown in FIG. 9. The term "merging" shown in this instance implies an automated control in which the vehicle 100 is made to travel from the merging lane 104 into the main lane 106.

In FIG. 8, that which is described in the line of "lane keeping" is control content executed by the automated control ECU 38 in a situation in which the vehicle 100 remains in the travel lane 110 without entering a branch road 108 such as into a service area SA, as shown in FIG. 9. The term "OK" shown in this instance implies an automated control in which the vehicle 100 is maintained within the travel lane 110. The term, "arousal of interest" implies that the interest of the driver H is aroused by way of voice or a display, and the driver H is prompted to assume a hands-on state. The degree of compulsion is lower for "arousal of interest" than for "warning".

In FIG. 8, that which is described in the line of "lane change" is control content executed by the automated control ECU 38 in a situation in which the vehicle 100 makes a lane change from the travel lane 112 into the travel lane 110, as shown in FIG. 9. The term "0.3 G" shown in this instance implies an automated steering control in which a lateral G upper limit value at a time of the lane change is 0.3 G. Further, the term "0.2 G" implies an automated steering control in which a lateral G upper limit value at a time of the lane change is 0.2 G. Further, "prohibited" implies that a lane change by the automated steering control is prohibited.

In FIG. 8, that which is described in the line of "automated branching" is control content executed by the automated control ECU 38 in a situation in which the vehicle 100 branches or diverges from the main lane 106 in a branching lane 114, as shown in FIG. 9. The term "branching" shown in this instance implies an automated control in which the vehicle 100 is made to travel from the main lane 106 into the branching lane 114.

In FIG. 8, that which is described in the line of "automated driving end" is control content executed by the automated control ECU 38 in a situation of ending automated driving. The term "end" shown in this instance implies that ending is possible at a time of ending the automated control. Stated otherwise, in the case that an ending instruction is received, the automated control ECU 38 ends the automated control.

The first control is executed when the driver H is not looking aside and is in a hands-on state. At this time, the driver H is in a state of being capable of performing manual operations immediately. Stated otherwise, the driver H is ready to immediately take over the authority for operating the vehicle from the side of the vehicle 100. As shown in FIG. 8, in the first control, all of the automated controls can be executed, and they can be executed to a maximum extent without limiting the individual automated controls.

The second control is executed when the driver H is not looking aside and is in a hands-off state. At this time, the driver H is in a state in which it is difficult to perform manual operations due to the hands being released from the steering wheel 70. Stated otherwise, the driver H is in a state in which the authority for operating the vehicle cannot be immediately handed over from the side of the vehicle 100. For this reason, as shown in FIG. 8, the degree of automation in the automated control and/or the degree of change in the vehicle behavior in the automated control are limited. For example, the degree of change in vehicle behavior is limited in the situations of traveling on a ramp and lane changing. In this instance, the lateral G is limited to 0.2 G. This value is lower than the 0.3 G value of the first control. Therefore, in the second control, the passing speed at the time of ramp traveling and the execution speed of the lane change are slower than in the first control.

The third control is executed when the driver H is looking aside and is in a hands-on state. At this time, the driver H is in a state in which it is difficult to perform manual operations due only to the fact that the driver H is looking aside. Stated otherwise, the driver H is in a state in which the authority for operating the vehicle cannot be immediately handed over from the side of the vehicle 100. For this reason, as shown in FIG. 8, the degree of automation in the automated control and/or the degree of change in the vehicle behavior in the automated control are limited. For example, in a situation of making a lane change, the degree of automation is limited. In this instance, a lane change is prohibited.

The fourth control is executed when the driver H is looking aside and is in a hands-off state. At this time, the driver H is in a state in which manual operations are delayed due to the fact that the driver is looking aside, and the hands are released from the steering wheel 70. Stated otherwise, the driver H is in a state in which the authority for operating the vehicle cannot be immediately handed over from the side of the vehicle 100. For this reason, as shown in FIG. 8, the degree of automation in the automated control and/or the degree of change in the vehicle behavior in the automated control are further limited more so than in the second and third controls. In this instance, a warning is issued without performing any of the automated controls. In addition, as shown in step S11 of FIG. 7, in the case that the inattentive state and the hands-off state are still present after the warning, the automated control ECU 38 decelerates and stops the vehicle 100.

As shown in FIG. 8, in the case that dozing or a sudden illness is recognized, the automated control ECU 38 immediately decelerates and stops the vehicle 100.

9. Summary of Embodiment

The automated driving control device 10 is equipped with the monitor device 14 (recognition unit), the automated control device 12 (automated controller), and the contact determining device 16 (determination unit). The monitor device 14 recognizes the peripheral monitoring state of the driver H. The automated control device 12 automatically controls the steering and/or the acceleration or deceleration of the vehicle 100, and further, in the case that a switching operation, and more specifically, an override operation is carried out in order to prioritize manual control of steering and/or acceleration or deceleration during the automated control, terminates the automated control of steering and/or acceleration or deceleration. The contact determining device 16 determines the state of ease of the switching operation. The automated control device 12 changes the degree of automation in the automated control, or the degree of change in the vehicle behavior in the automated control, on the basis of the peripheral monitoring state recognized by the monitor device 14, and the state of ease of the switching operation determined by the contact determining device 16 (the first to fourth controls in FIG. 8).

The monitor device 14 recognizes, as the peripheral monitoring state, whether or not the driver is inattentive. Further, the contact determining device 16 determines, as the state of ease of the switching operation, whether or not the driver H can immediately perform the manual control. More specifically, a determination is made as to whether or not the driver H is contacting the steering wheel 70, and more specifically, whether the driver H is in a hands-on or a hands-off state.

The automated driving control device 10 changes the degree of automation in the automated control or the degree of change in the vehicle behavior in the automated control, on the basis of the peripheral monitoring state of the driver H, and the state of ease of the switching operation to prioritize the manual control over the automated control. In this manner, according to the automated driving control device 10, the automated control of the steering and acceleration/deceleration is not stopped uniformly, but rather, the degree of automation or the degree of change in the vehicle behavior is changed dynamically, and therefore, it is possible to ensure the convenience of the automated control. Further, the peripheral monitoring state of the driver H, and the state of ease of the operation to prioritize the manual control over the automated control reflect the intention of the driver H to operate the vehicle. Therefore, according to the automated driving control device 10, it is possible to set the degree of automation in accordance with the intention of the driver H to operate the vehicle.

The automated control device 12 prohibits a lane change by the automated control (Third Control of FIG. 8), in the case that the inattentive state of the driver H is recognized by the monitor device 14 (step S3 of FIG. 7: NO), and it is determined by the contact determining device 16 that the driver H is contacting the steering wheel 70 (step S5 of FIG. 7: YES). In accordance with the present embodiment, even if the driver H is contacting the steering wheel 70, if the driver H is looking aside or is in attentive, the degree of automation is reduced. In this manner, in the case that the intention of the driver H to operate the vehicle is decreased, a portion of the functions of the automated control are restricted, and a portion of the functions are continued, whereby it is possible to ensure the convenience of automated driving. Further, it is possible to perform appropriate automated driving in accordance with the intention of the driver H to operate the vehicle.

The automated control device 12 delays the execution speed of the lane change by the automated control (Second Control of FIG. 8), in the case that the inattentive state of the driver H is not recognized by the monitor device 14 (step S3 of FIG. 7: YES), and the contact determining device 16 determines that the driver H is not contacting the steering wheel 70 (step S4 of FIG. 7: NO), compared to a case in which the inattentive state of the driver H is not recognized by the monitor device 14 (step S3 of FIG. 7: YES), and it is determined by the contact determining device 16 that the driver H is contacting the steering wheel 70 (step S4 of FIG. 7: YES). In accordance with the present embodiment, if the intention of the driver H to operate the vehicle is decreased, the rate of change in the vehicle behavior is lowered in comparison with the case prior to the decrease. In this manner, in the case that the intention of the driver H to operate the vehicle is decreased, a portion of the functions of the automated control are restricted, and a portion of the functions are continued, whereby it is possible to ensure the convenience of automated driving. Further, it is possible to perform appropriate automated driving in accordance with the intention of the driver H to operate the vehicle.

The automatic driving control device 10 further includes the warning device 58. The automated control device 12 operates the warning device 58 and carries out deceleration by the automated control (Fourth Control of FIG. 8), in the case that the inattentive state of the driver H is recognized by the monitor device 14 (step S3 of FIG. 7: NO), and it is determined by the contact determining device 16 that the driver H is not contacting the steering wheel 70 (step S5 of FIG. 7: NO). In accordance with the present embodiment, in the case that the intention of the driver H to operate the vehicle cannot be confirmed, a warning is issued and the vehicle 100 is decelerated. Therefore, in a situation in which manual control of the vehicle 100 is required, the driver H is prompted to pay attention, and further, higher safety can be ensured.

10. Other Embodiments

In the above-described embodiment, the contact sensor 72 is used in order to determine the hands-on state and the hands-off state. However, the hands-on state and the hands-off state may be determined using a camera. Further, in the above-described embodiment, the state in which the driver H is contacting the steering wheel 70 (the hands-on state or the hands-off state) is determined as a state of ease of the switching operation (override operation). Apart therefrom, as the state of ease of the switching operation (override operation), a state may be determined in which the driver H is in contact with the accelerator pedal and/or the brake pedal. Alternatively, a state may be determined in which the driver H is seated in the driver's seat. In either case, the determination of such states can be realized by using a pressure sensor, a contact sensor, or a camera.

The contact determining device 16 according to the present invention is not limited to the above-described embodiment, and it is a matter of course that various configurations could be adopted therein without departing from the essence and gist of the present invention. For example, instead of using an electrostatic capacitive contact sensor 72, a pressure sensor may be used.

11. Description of Reference Numerals

10 . . . Automated Driving Control Device
12 . . . Automated Control Device (Automated Controller)
14 . . . Monitor Device (Recognition Unit)
16 . . . Contact Determining Device (Determination Unit)
58 . . . Warning Device
70 . . . Steering Wheel
100 . . . Vehicle

The invention claimed is:

1. An automated driving control device, comprising:
a non-transitory memory; and
a processor configured to operate as:
a recognition unit adapted to recognize a peripheral monitoring state of a driver;
an automated controller adapted to perform an automated control of at least one of steering, acceleration and deceleration of a vehicle, and terminate the automated control of the at least one of steering, acceleration and deceleration, in the case that a switching operation is carried out to prioritize manual control of the at least one of steering, acceleration and deceleration during the automated control; and
a determination unit adapted to determine a state of ease of the switching operation;
on the basis of the peripheral monitoring state recognized by the recognition unit and the state of ease of the switching operation determined by the determination unit, the automated controller:
alters a degree of all of automated controls which are permitted to be executed in relation to all of automated controls that are capable of being executed, or
alters a permitted amount of change of vehicle behavior over time when at least one of steering, acceleration and deceleration of the vehicle is performed in the automated control,
wherein the recognition unit recognizes, as the peripheral monitoring state, whether or not the driver is inattentive,
wherein the determination unit determines, as the state of ease of the switching operation, whether or not the driver is contacting the steering wheel of the vehicle, and
wherein the automated controller lowers an upper limit of a lateral acceleration generated while the vehicle is traveling on a ramp or the vehicle is making a lane change, in the case that the inattentive state of the driver is not recognized by the recognition unit and the determination unit determines that the driver is not contacting the steering wheel, compared to a case in which the inattentive state of the driver is not recognized by the recognition unit, and it is determined by the determination unit that the driver is contacting the steering wheel.

2. The automated driving control device according to claim 1, wherein the determination unit determines, as the state of ease of the switching operation, whether or not the driver can immediately perform the manual control.

3. The automated driving control device according to claim 1, wherein the automated controller prohibits a lane change by the automated control in the case that the inattentive state of the driver is recognized by the recognition unit, and it is determined by the determination unit that the driver is contacting the steering wheel.

4. The automated driving control device according to claim 1, further comprising:
a warning device;
wherein the automated controller operates the warning device and carries out deceleration by the automated control, in the case that the inattentive state of the driver is recognized by the recognition unit, and it is determined by the determination unit that the driver is not contacting the steering wheel.

* * * * *